United States Patent Office 3,481,883
Patented Dec. 2, 1969

3,481,883
AZEOTROPIC COMPOSITION
Shiro Aoyama, Soka-shi, and Toshio Yamamoto, Settsu-shi, Osaka-fu, Japan, assignors to Daikin Kogyo Co., Ltd., Osaka-shi, Osaka-fu, Japan
No Drawing. Filed Aug. 28, 1967, Ser. No. 663,537
Int. Cl. C11d 7/50; C09d 9/04
U.S. Cl. 252—171                                          1 Claim

ABSTRACT OF THE DISCLOSURE

An azeotropic composition consisting of about 42.8% by weight of 1,1,2,2-tetrachloro-1,2-difluoroethane and about 57.2% by weight of ethylene dichloride and being useful as a solvent, a cleaning agent or a diluent, characterized by excellent solvent power, high volatility, harmlessness and noninflammability.

---

The present invention relates to an azeotropic composition. More particularly, it relates to an azeotropic composition of 1,1,2,2-tetrachloro-1,2-difluoroethane [hereinafter referred to as "tetrachlorodifluoroethane"] and ethylene dichloride.

Hitherto, some polyhalogenated lower alkanes such as trichlorofluoromethane, trichlorotrifluoroethane and tetrachlorodifluoroethane have been used as solvents suited particularly to greases, oils, waxes and the like. Among them, tetrachlorodifluoroethane is superior to others in harmlessness and noninflammability but inferior in some physical properties. That is, the boiling point of tetrachlorodifluoroethane, 92.8° C., is far higher than those of trichlorofluoromethane (23.8° C.) and trichlorotrifluoroethane (47.6° C.). In addition, the freezing point of tetrachlorodifluoroethane is 26° C., which is relatively high. These prevent its utilization as a solvent, e.g. for aerosol preparations, in the winter season. On the other hand, the demand for good and safe solvents is remarkably increasing in recent years with the advances of chemical, mechanical and electric industries.

It has now been found that tetrachlorodifluoroethane and ethylene dichloride are azeotropically distilled to form a minimum constant boiling mixture, the contents of tetrachlorodifluoroethane and ethylene dichloride in the mixture being respectively about 42.8% by weight and about 57.2% by weight. It has also been found that the mixture possesses improved physical properties in comparison with tetrachlorodifluoroethane. The present invention is based on these findings.

Accordingly, a basic object of the present invention is to embody a novel azeotropic composition consisting of tetrachlorodifluoroethane and ethylene dichloride. Another object of this invention is to embody an azeotropic composition being valuable as a solvent of widesrpead uses. A further object of the invention is to embody a composition which is characterized by excellent solvent power, high volatility, harmlessness and noninflammability. These and other objects will be apparent to those conversant with the art to which the present invention pertains from the above and subsequent descriptions.

The azeotropic composition of this invention is obtained by distilling azeotropically a mixture of tetrachlorodifluoroethane and ethylene dichloride in a per se conventional procedure. For instance, the distillation of a 1:1 mixture by volume of tetrachlorodifluoroethane and ethylene dichloride through the Oldershaw's apparatus [cf. C. F. Oldershaw: Ind. Eng. Chem., Anal Ed, 13, 265 (1941)] with 15 plates at a reflux ratio of 10:1 affords the azeotropic composition, which consists of about 42.8% by weight of tetrachlorodifluoroethane and about 57.2% by weight of ethylene dichloride.

The physical properties of the azeotropic composition are shown in the following table in comparison with those of each component:

TABLE

| Physical properties | Tetrachlorodifluoroethane | Ethylene dichloride | Azeotropic composition |
|---|---|---|---|
| Boiling point (° C.) at 760 mm. Hg | 92.8 | 83.5 | 80.9 |
| Specific gravity | 1.6360 (30° C.) | 1.2250 (20° C.) | 1.3838 (25° C.) |
| Freezing point (° C.) | 26.0 | −35.5 | −12.0 |
| Viscosity (cp.) at 25° C. | 1.21 | | 0.7784 |
| Refractive index at 25.8° C. | 1.4130 | 1.4445 | 1.4289 |
| Surface tension (dyne/cm.) | 23.0 | 32.2 | 35.5 |
| Vapor pressure (mm. Hg) at 25° C. | 53 | 62 | 110 |
| Vaporization velocity at 25° C.[1] | 35 | 79 | 68 |
| Solubility parameter at 25° C.[2] | 8.0 | 9.9 | 9.4 |
| Inflammability | None | None | None |

[1] Relative vaporization velocity against carbon tetrachloride of which vaporization velocity is regarded to be 100.
[2] Calculated from latent heat at 25° C., the latent heat being obtained from vapor pressure curve.

As shown in the above table, the freezing point of the azeotropic composition is −12° C., which is lower than that of tetrachlorodifluoroethane by 38° C. Thus, the azeotropic composition does not suffer from freezing even in the winter season, and the scope of utilization is sufficiently expanded. Since the constant boiling point is about 12° C. lower than tetrachlorodifluoroethane and about 2.5° C. lower than ethylene dichloride, the recovery of the azeotropic composition after the uses is apparently easier than that of each sole component. It is also apparent from the foregoing table that the vaporization velocity of the said composition is two times as high as that of tetrachlorodifluoroethane. As the surface tension is strong, the azeotropic composition has sufficient adhesion to be used as a powerful cleaning agent. The fact that the azeotropic composition has a small viscosity and a large vapor pressure shows that it is so highly volatile as to be used for the purpoe demanding a high volatility. The azeotropic composition is quite noninflammable and nontoxic so that it can be employed without any consideration of such danger or harm. Furthermore, it has a great solvent power; that is, the solubility parameter is 9.4 and all substances having such a parameter as about 9.4 can be easily dissolved. Thus achieved excellent properties in low freezing point, high volatility, powerful solubility, noninflammability and harmlessness suggest enormous utility in the aerosol manufactures. In fact, the azeotropic composition is particularly valuable as a diluent of the ingredients in the aerosol preparations. On the other hand, the azeotropic composition is not affected when brought into contact with various metals and is particularly stable against acids and bases. This means the storage of the composition per se as well as various preparations comprising the same can be achieved with no substantial difficulties. Similarly, the azeotropic composition does not cause decomposition of the ingredients dissolved therein, when used for various aerosol preparations such as insecticides or cosmetics, even during a long storage. The azeotropic composition can also be useful as a cleaning agent for various parts of electric instruments, printed circuit, precision apparatus, optical glasses and the like. Further, it can be utilized as a solvent or diluent for paints, printing inks and the like.

A practical embodiment of this invention is illustratively shown in the following example.

EXAMPLE

A mixture of tetrachlorodifluoroethane (500 g.) and ethylene dichloride (500 g.) is distilled through a glass column of 4.5 cm. in diameter and 125 cm. in length packed with ⅜ inch McMahon packings (stainless steel net) at a reflux ratio of 5/1 and a take off of 3.5 g./min. (2.6 ml./min.) whereby the azeotropic composition (809 g.) containing 42.8% by weight of tetrachlorodifluoroethane and 57.2% by weight of ethylene dichloride and having a boiling point of 80.9° C. at 760 mm. Hg is obtained. In the kettle of the distillation apparatus, there remains a mixture (101 g.) of 60.6% by weight of tetrachlorodifluoroethane and 39.4% by weight of ethylene dichloride.

In machine oil (ASTM Oil No. 1), there are immersed 100 aluminum plates, each plate being 1 mm. in thickness, 10 cm. in length and 1 cm. in width. The plates are taken out and, after dripping almost ceases within several minutes, admitted in the extracting room of a Soxhlet's extractor. The sticking oil weighed is 21 g. The azeotropic composition obtained as above is charged in the kettle of the extractor, and refluxing is carried out for 1 hour. The extractor is allowed to cool, and the washing solvent is subjected to simple distillation to give an azeotropic mixture (413 g.) boiling at 76 to 81° C. with 74 g. of the residue in the kettle. On macroscopic observation, the plates show the same appearance as being before immersion. Thus, the machine oil is completely eliminated.

From the preceding description, it will be apparent that this invention provides a novel azeotropic composition which has unusual and unexpected properties and which is useful for a wide variety of purposes. Accordingly, it will be apparent that this invention constitutes a valuable contribution to and advance in the art.

What is claimed is:

1. An azeotropic composition consisting of about 42.8% by weight of 1,1,2,2-tetrachloro-1,2-difluoroethane and about 57.2% by weight of ethylene dihcloride, the boiling point of said composition being about 80.9° C. at a pressure of 760 mm. Hg.

References Cited

UNITED STATES PATENTS 2,310,569   2/1943   Booth _____ 252—171
3,285,858   11/1966  Hirsch et al. _____ 252—171

OTHER REFERENCES

Mellan: Industrial Solvents, Reinhold Publ. Co. (1950), p. 75.

LEON D. ROSDOL, Primary Examiner

W. SCHULZ, Assistant Examiner

U.S. Cl. X.R.

106—311; 134—34, 38, 40; 252—67, 364